Sept. 22, 1959          J. MERCIER                 2,905,432
                         VALVES
Filed Aug. 18, 1954                          3 Sheets-Sheet 1
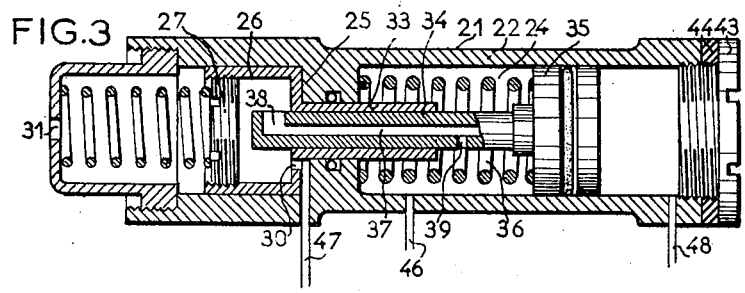
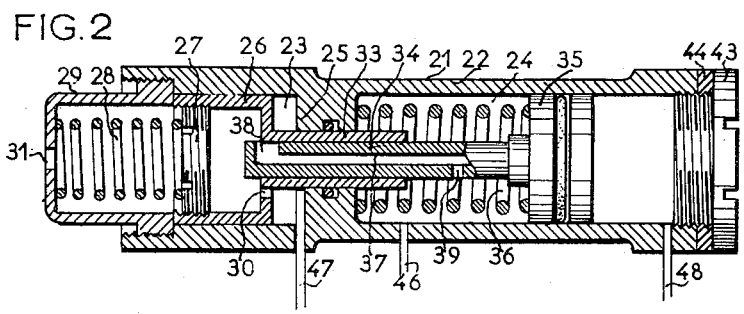
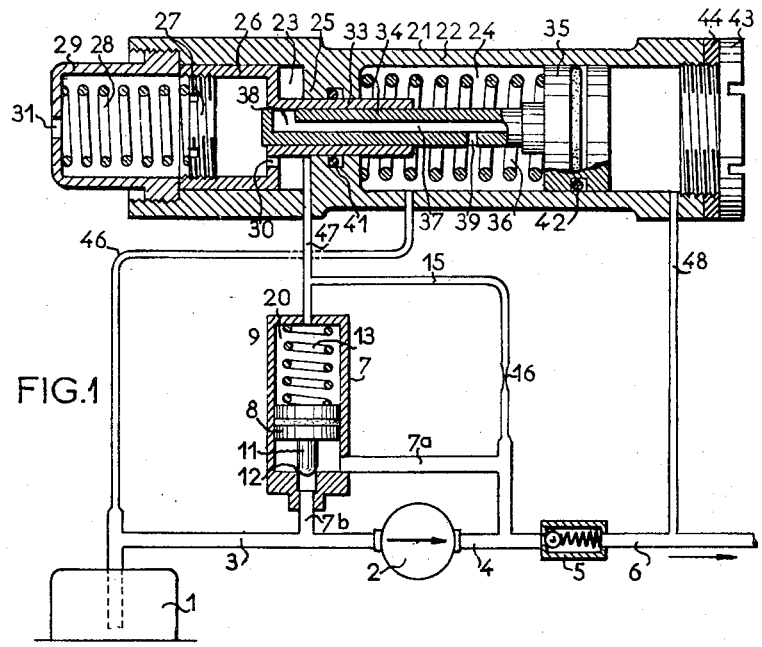
Inventor
J. Mercier

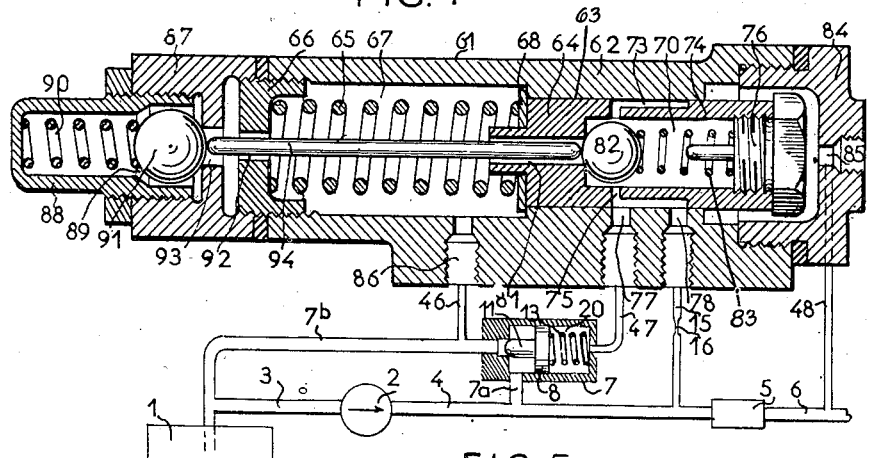
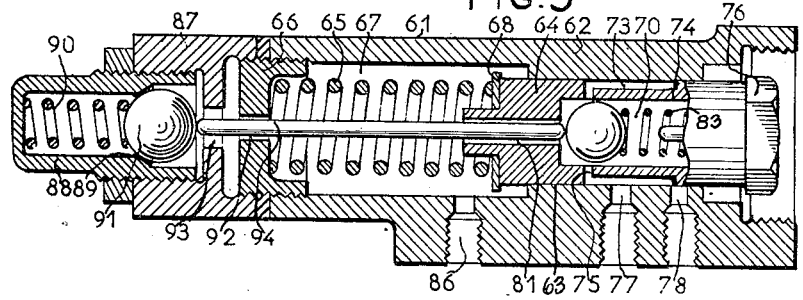
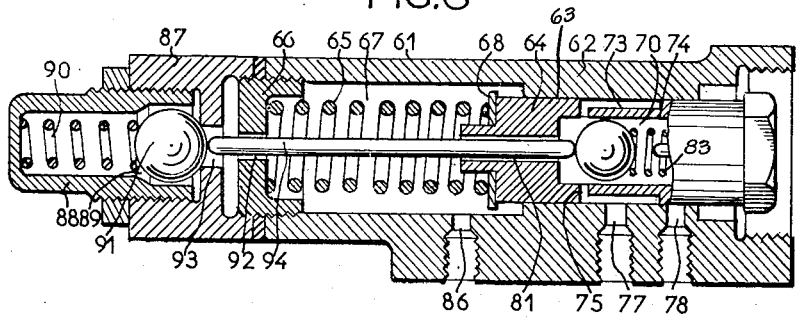

Sept. 22, 1959 J. MERCIER 2,905,432
VALVES
Filed Aug. 18, 1954 3 Sheets-Sheet 3
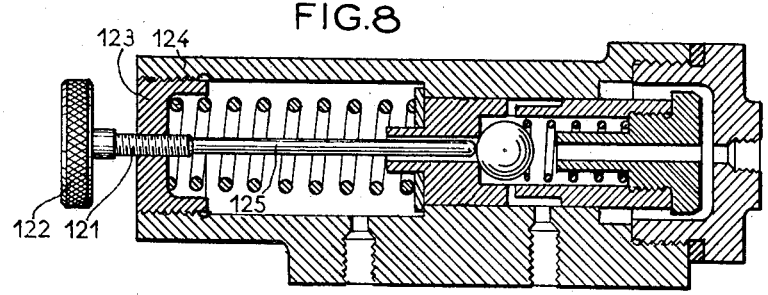
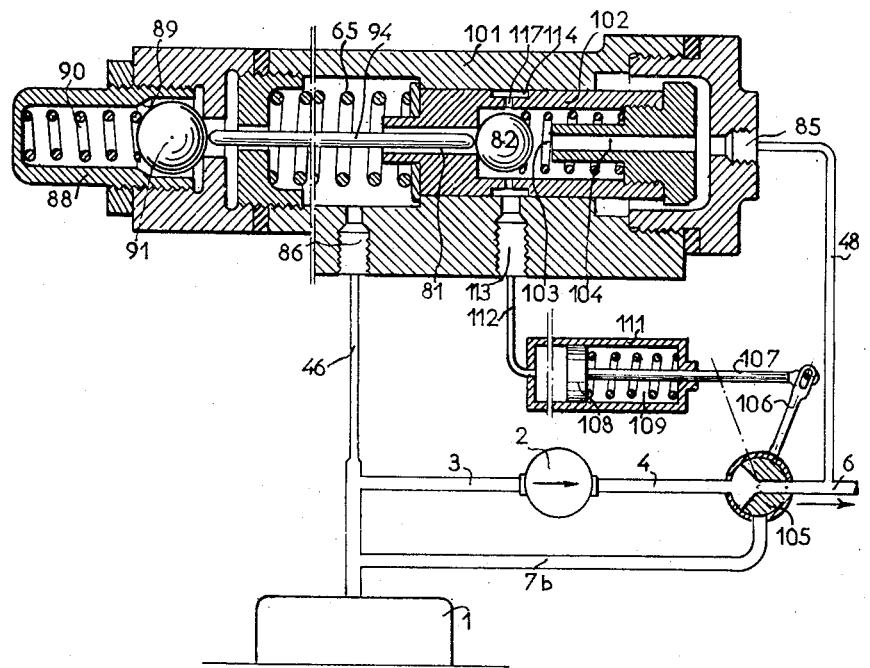
Inventor
J. Mercier
By Gleason Downing Seebee
Attys.

United States Patent Office 2,905,432
Patented Sept. 22, 1959

2,905,432

VALVES

Jean Mercier, New York, N.Y.

Application August 18, 1954, Serial No. 450,642

8 Claims. (Cl. 251—63)

The present invention relates to valves and more particularly to automatic valves. The invention relates still more particularly to pressure control pilot valves.

One object of the invention is to ensure a sudden large opening of the valve upon a crack opening of the same.

Another object of the invention is to provide a valve in which both members between which the opening is produced are movable, means being provided to suddenly displace one of said members upon a slight displacement of the other in the opposite direction, thus ensuring the desired snap action.

Still another object of the invention is to provide a valve comprising two movable members cooperating for closing and opening said valve, resilient means urging one of said members to open said valve, means being provided to render said resilient means inoperative as long as the other movable member is stationary, but permitting said resilient means to freely operate upon the slightest displacement of said other movable member tending to open said valve.

A further object of the invention is to oppose said resilient means acting on one of said movable members by a force exerted by a fluid pressure on a movable member and to let said fluid pressure drop upon a slight displacement of the other movable member.

A still further object of the invention is to design an automatic pressure control valve of the character described in which a first movable member is constantly submitted to the fluid pressure to be controlled acting against calibrated spring means, the resilient means urging the other movable member into opening position being opposed by said fluid pressure, acting on a part movable in a closed chamber means being provided for letting said fluid pressure drop in said chamber upon a displacement of said first movable member corresponding to the limit of the allowed raise of pressure.

Another object of the invention is to provide a fluid pressure circuit comprising a pressure control pilot valve of the character described in combination with a pump and an unloading valve, said pilot valve being so operatively connected to said unloading valve as to provide for a snap action of said unloading valve.

Other objects and advantages of the invention will be better apparent from the detailed description together with the accompanying drawings submitted for purposes of illustration only and not intended to define the scope of the invention, reference being had for that purpose to the subjoined claims.

Fig. 1 diagrammatically illustrates, in axial section, a first embodiment of a valve according to the invention as applied in a hydraulic system for controlling an unloading valve, Figs. 2 and 3 show the same valve alone, with parts thereof in different relative positions, Fig. 4 is a diagrammatical view similar to that of Fig. 1, but showing a second embodiment, Figs. 5 and 6 are similar views of the valve alone with parts thereof in various relative positions, Fig. 7 shows a third embodiment of a valve according to the invention, also incorporated in a hydraulic system with a view to control an unloading valve, and Fig. 8 shows in axial section one embodiment of a simplified valve according to the invention, with a particular adjusting means.

Referring first to Fig. 1, one embodiment of the invention will be described in connection with a hydraulic system which includes a tank 1, a pump 2 the suction side of which is connected to the tank 1 by a pipe 3 and the delivery side of which is connected to an utilization circuit through a pipe 4, a check valve 5 and a pipe 6.

An unloading valve 7 is connected through pipes 7a and 7b to the outlet pipe 4 of the pump 2 and to the inlet pipe 3. The unloading valve 7 has a piston 8 adapted to reciprocate within a cylinder 9 and formed with a plug 11 which is adapted to come into and out of engagement with a seat 12. A compression spring 13 inserted between the end of the cylinder 9 opposite to the seat 12 and the corresponding side of the piston 8 urges said piston toward said seat in order to close this unloading valve 7.

A pipe 15 having a restricted passage as at 16 establishes a communication between the delivery side 4 of the pump and the chamber of the unloading valve 7 on the side of the piston 8 opposite to the side which carries the plug 11, in such manner that the fluid pressure prevailing in said chamber is added to the action of the compression spring 13.

I will now describe a pilot valve according to my invention adapted to control the operation of the unloading valve 7 in order to ensure that the fluid pressure in the utilization circuit varies only within a predetermined range between a given lower pressure $P_1$ up to a given higher pressure $P_2$.

Said pilot valve is generally indicated as at 21 and includes a cylindrical casing 22 divided lengthwise into two chambers 23, 24, by a partition 25.

Reciprocally, in chamber 23 is a hollow piston member 26 which is provided with a plug 27 threadedly and fixedly engaged within said piston 26. The piston 26 is urged toward the partition 25 by a compression spring 28 one end of which is bearing against the outer face of the plug 27 while its other end bears against the inner bottom face of a cap 29 threaded in the outer end of chamber 23. The cap 29 is provided with an opening 31 in order to prevent any pressure to build up within said cap as the piston 26 moves towards this cap. A hole 30 is provided in the end wall of the piston member 26.

The piston 26 is formed with an extension 33 of smaller diameter which extends through a central opening of the partition 25 into the other chamber 24 and serves as a guiding member for a rod 34 axially movable in said extension 33. The rod 34 is rigid with a piston 35 adapted to reciprocate in the chamber 24. Another compression spring 36 urges the piston 35 away from the partition 25.

The piston rod 34 is hollow and has a longitudinal bore 37 which opens into a radial aperture 38 adapted to cooperate with the inner surface of the bottom of the piston member 26. Another aperture 39 establishes a communication between the longitudinal bore 37 of the piston rod 34 and the chamber 24.

The chamber 24 is sealed by a screw plug 43 with a gasket 44 inserted therebetween.

The above described hydraulic system and pilot valve are connected with each other in the following manner: the chamber 24 is connected to the tank 1 through a return pipe 46; the chamber 23 is connected to the unloading valve 7 through a pipe 47; and the fluid pressure delivered by the pump through the check valve 5 to the pipe 6 is led to the outer face of the piston 35 through a pipe 48.

The operation of the whole assembly is as follows:

During normal operation, the pump 2 delivers a fluid pressure to the utilization circuit through pipe 6. This pressure is also delivered to the pipe 48 and therefore exerts a corresponding force on the piston 35 against the action of the compression spring 36. Simultaneously, the delivery pressure is also led through the restricted passage 16 into the chamber 23 and pushes the piston member 26 against the action of the spring 28 until said piston member comes into engagement with the inner edge of the cap 29, as shown in Fig. 1. The device is so adjusted that within the pressure range $P_1$—$P_2$ the radial aperture 38 is positioned within the bore of the extension 33 which results in the interior of the piston member 26 being sealed. The passage 16 being a restricted one, there is no flow in the pipe 47 and consequently in the pipe 15. The full delivery pressure is applied upon the outer face of the piston 8 of the unloading valve 7, thus forcing the plug 11 against the seat 12, i.e. closing the unloading valve. The plug 11 has no tendency to be lifted away from the seat 12 since the delivery pressure coming from the pipe 7a is conducted to a face of the piston 8 the area of which is smaller than that of the other face of said piston and also because of the action of the spring 13.

Should the pressure in the utilization circuit rise beyond the upper predetermined limit $P_2$, the piston 35 moves against the action of the spring 36 by such a distance that the aperture 38 in the piston rod 34 becomes exposed out of the bore of the extension 33, as shown in Fig. 2. The pressure prevailing within the hollow piston member 26 suddenly drops the fluid escaping through the aperture 38, channel 37, aperture 39, chamber 24, pipe 46 and back to the tank 1. Due to the restricted character of the passage 16, the pressure also suddenly drops within the chamber 23 so that the spring 28 suddenly pushes the piston member 26 in a snap action (see Fig. 3) toward the partition 25 until said piston comes into engagement therewith. This snap action causes the aperture 38 to be widely open and therefore the area of the cross-section provided in the return circuit above described is suddenly increased to its maximum value.

This results in a sudden and definite drop of pressure in the chamber 20 of the unloading valve 7 whereas the full pressure still is conducted through the pipe 7a into said unloading valve 7. The plug 11 is lifted by said full pressure away from its seat 12 against the action of the spring 13 thus opening the unloading valve 7 and allowing the pump 2 to operate in the closed circuit constituted by the pipe 4, pipe 7a, valve 7, pipe 7b, and pipe 3.

The fluid pressure in the utilization circuit, and in the pipe 48 decreases, so that the force exerted by said pressure upon the piston 35 also decreases. The spring 36 gradually pushes back the piston 35 until the moment when the aperture 38 of the piston rod 34 gets obturated by the wall of the extension 33. This occurs when the pressure decreases below the lower predetermined limit pressure $P_1$. At this moment, the interior of the piston member 26 is suddenly isolated from the return circuit above mentioned, so that the pressure rises immediately within said piston member, the pipes 47 and 15, and in the chamber 20 of the unloading valve 7. Said valve, therefore, closes, while the piston member 26 is urged by the pressure against the action of the spring 28 until said piston member comes into bearing engagement with the inner edge of the cap 29.

All the parts are then back in the position they occupied at the beginning of the cycle which has just been fully described. From now on, the pump 2 again delivers fluid pressure towards the pipe 6 and when the pressure $P_2$ is again reached, the operations above described again take place.

It will be seen that the snap action caused by the sudden movement of the piston member 26 produces an instantaneous opening of the unloading valve due to the sudden drop of pressure achieved by the sudden increase in the area of the cross-section of the return circuit. In this manner no hydraulic recoil nor vibration of the unloading valve is to be feared.

The calibration of the spring 36, together with the length of the stroke of the piston member determine the operating range of the unloading valve 7 between said predetermined lower pressure $P_1$ and said predetermined higher pressure $P_2$.

Now, I will describe a second embodiment of my invention, with reference to Figs. 4 to 6 inclusive.

Fig. 4 illustrates a hydraulic system similar to that of Fig. 1, i.e. a hydraulic system which comprises a tank 1; an inlet pipe 3, a pump 2, an outlet pipe 4, a check valve 5, a pipe 6, an unloading valve 7 and a restricted passage 16 inserted in a pipe 15.

In this embodiment the pilot valve which is now to be described is somewhat different in structure as compared with the pilot valve 21 in the embodiment of Fig. 1. In Fig. 4 the pilot valve generally indicated by the reference 61 has a body 62 formed with a bore 63 in which a piston 64 is reciprocably mounted. The piston 64 is urged toward the right (as shown in Fig. 4) by a compression spring 65 one end of which is bearing against a plug 66 which is screwed in an enlarged portion 67 of the bore of the body 62, and the other end of which is bearing upon a washer 68 engaged on a reduced portion of one end of the piston 64. The outer diameter of the washer 68 is of a size comprised between the diameter of the enlarged bore 67 and that of the bore 63 so that the spring 65 is unable to push any further the piston 64 toward the right as soon as said washer is in bearing engagement with the shoulder formed at the end of the bore 63.

The piston 64 has formed on the outer periphery thereof an annular groove 73 which communicates with an axial bore 74 of the piston 64 through radial holes 75. A plug 76 screwed into the outer end of the bore 74 obturates said end of the piston 64. A port 77 through the wall of the body 62 of the pilot valve is connected to the pipe 47 and adapted to be constantly in communication with the annular groove 73 of the piston 64 regardless of the longitudinal position of said piston with respect to the body 62 during operation. Another port 78 through the wall of the body 62 of the pilot valve is connected to the pipe 15 and is adapted to be alternately opened and closed as the piston 64 moves to and fro in the body 62.

A small axial bore 81 allows the interior of the piston 64 to communicate with the chamber 67 of the valve, while a ball 82 is adapted to obturate said axial bore 81 under the action of fluid pressure and a compression spring 83.

A cap 84 screwed in one end of the body 61 obturates the bore 63 and has a port 85 connected through pipe 48 to the delivery side of pump 2.

Finally a further port 86 which opens into the chamber 67 is connected with the pipe 46.

A nut 87 is threaded over the outer end of the plug 66 and serves as a support for a cap 88 threadedly adjustable lengthwise in said nut 87. The cap 88 is formed with a conical seat 89 adapted to serve as a bearing for a ball 91 which is urged away from said seat by a compression spring 90. The spring 90 is stronger than the spring 83.

The plug 66 and the nut 87 are provided with axial bores 92, 93, respectively. A push-rod 94 extends axially through said bores 92, 93 and also through the bore 81 of the piston 64. The length of the rod 94 must be accurately predetermined as will be readily understood from the following description of the operation of the device.

In normal operation, the fluid pressure delivered by the pump 2 is directed through the pipe 4, the check-valve 5 and the pipe 6 to the utilization circuit; it is also directed through the pipe 48 to the outer end of the piston 64, i.e. to the plug 76. Said piston 64 is therefore urged toward the left (as shown in Fig. 4) against the action of the spring 65. The delivery pressure also is directed through the restricted passage 16, pipe 15, port 78, annular groove 73 and holes 75 inside the piston 64. The pressure that prevails within piston 64 contributes, in cooperation with spring 83 in applying the ball 82 against its seat, thus isolating chamber 67 from chamber 70.

The delivery fluid pressure coming out of the restricted passage 16 is transmitted through pipe 15, port 78, annular groove 73, port 77 and pipe 47 to the chamber 20 of the unloading valve 7. The piston 8 of said unloading valve is subjected on both faces thereof to the delivery pressure and the spring 13 applies the plug 11 against its seat thus closing this valve.

It should be observed that under normal operating conditions port 78 is uncovered, ball 82 is pushed against its seat, ball 91 is cleared from its seat 89 by spring 90, and rod 94 is floating freely between these two balls. There is no pressure in chamber 67 which is in communication with the tank 1 through the return circuit comprising the port 86 and pipes 46 and 7b.

As the delivery pressure rises, the piston 64 moves against the action of the spring 65. The ball 82 which is pressed upon its seat pushes the rod 94 which, in turn, pushes the ball 91 against the action of the spring 90, toward the seat 89.

Should the delivery pressure exceed a predetermined upper limit value $P_2$, the piston 64 is moved against the action of the spring 65 a distance such that the port 78 is obturated by the outer wall of the piston 64, while the ball 91 comes into engagement with its seat 89. At this moment, the slightest further movement of the piston 64 causes unseating of the ball 82 since the latter is abutting the rod 94 now stationary with respect to the main body 62. The pressure within the chamber 70 of the piston 64 is suddenly released through the axial bore 81 into the chamber 67 (see Fig. 5), and the spring 90 suddenly pushes the ball 91, the rod 94 and the ball 82 toward the right (as observed in Fig. 6). This results in the ball 82 being thrown away a relatively long distance from its seat in a snap action. The area of the passage for the fluid pressure from chamber 70 to chamber 67 is thus suddenly increased so that an instantaneous operation of the unloading valve 7 takes place due to the drop of pressure in chamber 70, holes 75, port 77, pipe 47 and chamber 20 of valve 7. The plug 11 thus moves away from its seat and the fluid delivered by the pump 2 is returned to the tank 1 through pipes 7a and 7b and the unloading valve 7.

As the pressure in pipe 48 decreases, the piston 64 is progressively restored to its original position shown in Fig. 4 under the action of the spring 65. The ball 91 is bearing against the edge of the hole 93 under the action of the spring 90 and the rod 94 is again floating freely. The ball 82 is then pushed by the spring 83 into engagement with its seat and the chamber 70 is thus closed. The pressure builds up in said chamber and causes the unloading valve 7 again to close. From now on, the pump 2 delivers pressure fluid through the check-valve 5 and the pipe 6 to the utilization circuit and the cycle which has just been described begins again.

It should be noted that by screwing the cap 88 more or less deeply into the body 87 it is possible to adjust lengthwise the position of the seat 89 for the ball 91, and consequently to adjust at will the exact pressure limits between which the valve should operate.

Referring to Fig. 7, I will now describe a modification of the device illustrated in Figs. 4–6.

In Fig. 7, the arrangement of the left hand side of the device is similar to that shown in Fig. 4 and will not be described again. The main difference between the two devices lies in the design of the piston 102 reciprocable in the valve body 101. The ball 82 is adapted to cooperate not only with the edge of the axial bore 81 of the piston but also with a seat 103 of an axial conduit 104 provided in the piston 102. The unloading valve 105 is actuated by a lever 106 connected to the outer end of a piston rod 107 rigid with a piston 108. The piston 108 is reciprocable within a cylinder 111 and is urged by a spring 109 in a direction which causes the unloading valve to become operative. The piston 108 is moved in the opposite direction by the fluid pressure admitted into the cylinder 111 through the pipe 112 and the port 113. The port 113 opens into an annular groove 114 of the piston 102 and is never obturated by said piston regardless of the longitudinal position of said piston 102 relative to said body 101.

A pipe 48 connects the pipe 6 to the axial conduit 104 of the piston.

Holes 117 establish a communication between the interior of the piston 102 and the outer annular groove 114 thereof.

The operation of the device that has just been described with reference to Fig. 7 is similar to that of the device of Fig. 4.

During normal operation of the hydraulic system, the fluid pressure in pipe 6 is transmitted, through pipe 48 and port 85 onto the piston 102 and urges it against the action of the spring 65. The fluid pressure is also directed through holes 117, annular groove 114, port 113 and pipe 112 to the piston 108 against the action of the spring 109, which results in the unloading valve 105, to be maintained in its inoperative position, i.e. the position illustrated in Fig. 7 in which fluid pressure is directly admitted from the delivery pipe 4 to the pipe 6.

Should the pressure exceed the upper predetermined limit, the ball 82 is pushed by the needle or rod 94 away from its seat formed by the right hand side end of the axial bore 81 and is applied against the seat 103. This takes place by a snap action as already explained in connection with the preceding embodiment illustrated in Figs. 4–6. The pressure inside the piston 102 and, therefore, in port 113, pipe 112 and unloading valve 111, suddenly drops through the axial conduit 81, port 86 and pipe 46, back to the tank 1. Under such conditions, piston 108 is actuated by spring 109 also in a sudden action and the unloading valve 105 is turned to its operative position, in which it connects delivery pipe 4 through pipe 7b with the intake side of pump 2.

Should the pressure fall below the minimum predetermined limit, piston 102 is restored to its original position by the spring 65, the ball 82 is applied against its seat formed on the end of the axial conduit 81, and the unloading valve 111, therefore, restored to inoperative position. As already explained in connection with the embodiment of Figs. 4–6, it is possible in the embodiment of Fig. 7 to adjust the operating pressure of the valve by screwing more or less the cap 88 into the body 101 of the valve.

In Fig. 8, a modification of the device of Fig. 7 has been shown, in which the means for adjusting the operating pressure of the valve merely consist of a screw 121 rigid with a knurled thumb nut 122 and threadedly engaged in a plug 123 which is fixedly mounted in the body 124 of the valve. The rod 125 of the embodiment shown in Fig. 8 serves the purpose of the rod 94 of the embodiment shown in Fig. 7. The operation of the modification is, otherwise, similar to that of the embodiment shown in Fig. 7.

It must be understood that the invention is not limited to the embodiments described and shown which have been given merely as examples. Many modifications may be carried out without departing from the scope of my invention as defined in the appended claims:

What is claimed is:

1. A pressure response device comprising a casing, a first movable member, a second movable member cooperating with said first movable member, said members defining a valve, said movable members being slidably mounted in said casing, resilient means reacting against said second movable member and tending to open said valve by displacement of said second movable member, means associated with said second movable member and exposed to fluid pressure opposing the displacement of said second movable member by the resilient means, thereby tending to keep said valve closed, and means to apply fluid under pressure to react against said first member to effect a predetermined displacement of said first movable member which slightly opens said valve, to relieve the pressure which is opposing the displacement of the second movable member, whereby said resilient means will effect a sudden displacement of said second movable member to substantially fully open said valve.

2. A valve according to claim 1, in which said first movable member is constituted by a piston reciprocable in a cylinder, spring means inserted between one face of the piston and the corresponding end of said cylinder tending to move said piston to close said valve, and fluid pressure means adapted to be directed into the space between the other face of said piston and the corresponding end of said cylinder tending to move said piston to open said valve.

3. A valve according to claim 1, in which said first movable member is mounted for sliding movement in said second movable member and is formed with an inner conduit provided with an inlet and an outlet passage, one of said passages being adapted to cooperate with a portion of said second movable member in order to open and close said valve as one of said members is moved in one direction or in the opposite one with respect to said other member.

4. A pressure responsive device comprising a body portion having a first, second and third space therein, a first inlet port in communication at all times with said first space and adapted to be connected to a source of fluid under pressure, a second inlet port in communication with said second space and adapted to be connected to such source of fluid under pressure, an outlet port in communication with said third space, said body portion having a passageway therein providing communication between said second and third spaces, valve means for controlling the flow of fluid under pressure through said passageway to said outlet port, said valve means comprising a movable member exposed to fluid pressure in said second space and adapted to be normally urged by such fluid pressure to close said passageway, resilient means reacting against said movable member in direction opposed to that exerted by such fluid pressure in said second space normally to open said passageway and a reciprocable control device in said body portion having a given area subjected to the fluid pressure in said first working space, said reciprocable device being operatively connected with said valve means to open said passageway when the pressure in said first space attains a predetermined value, whereby when said passageway is open to provide communication between said second and third spaces, the pressure in said second space will fall to permit movement of said movable member by said resilient means to fully open said valve means.

5. A valve according to claim 4 in which a seat is provided for said movable member at the end of the passageway in said second space, a slidably mounted rod extends through said passageway, the resilient means being positioned to react against one end of said rod, the other end of said rod reacting against said movable member.

6. A valve according to claim 5 in which said passageway is in said reciprocable control device, additional resilient means is provided in said reciprocable device reacting against said movable member to urge it toward said seat and abutment means to limit the movement of said rod upon movement of said reciprocable device.

7. A valve according to claim 6 in which said abutment means are adjustable.

8. A pressure responsive device comprising a body portion having a pressure chamber, an inlet chamber, and an outlet chamber, means to supply fluid under pressure to said pressure chamber and to said inlet chamber, said body portion having a passageway therein providing communication between said inlet chamber and said outlet chamber, valve means for controlling the flow of fluid under pressure through said passageway to said outlet chamber, and a valve actuating device in said body portion, said device including a first reciprocable member having a pressure face exposed to the fluid pressure in said pressure chamber whereby fluid pressure in said pressure chamber urges said member in one direction, a spring loaded second reciprocable member, and means to subject said second member to the pressure of fluid supplied to said inlet chamber to cause said second member to compress said spring as said first member moves in said one direction, said first and second reciprocable members being operatively connected with said valve means to open said passageway when the pressure in said pressure chamber attains a predetermined value, whereby when said passageway is opened to provide only a restricted communication between said inlet and outlet chambers, the pressure to which said second reciprocable member is subjected will fall to permit said second member to fully open said passageway under the action of its spring so as to provide unrestricted communication between said inlet and outlet chambers.

References Cited in the file of this patent

UNITED STATES PATENTS 2,649,115  Deardorff _____ Aug. 18, 1953